(12) United States Patent
Kimura et al.

(10) Patent No.: US 10,078,259 B2
(45) Date of Patent: Sep. 18, 2018

(54) OPTICAL SCANNING CONTROL DEVICE

(71) Applicants: Yuji Kimura, Tokyo (JP); Riichiro Hibiya, Tokyo (JP)

(72) Inventors: Yuji Kimura, Tokyo (JP); Riichiro Hibiya, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/556,333

(22) PCT Filed: Feb. 24, 2016

(86) PCT No.: PCT/JP2016/055392
§ 371 (c)(1),
(2) Date: Sep. 7, 2017

(87) PCT Pub. No.: WO2016/158099
PCT Pub. Date: Oct. 6, 2016

(65) Prior Publication Data
US 2018/0095356 A1    Apr. 5, 2018

(30) Foreign Application Priority Data

Mar. 31, 2015  (JP) ................................ 2015-071824

(51) Int. Cl.
*G03B 21/28* (2006.01)
*G03B 33/06* (2006.01)
(Continued)

(52) U.S. Cl.
CPC ........... *G03B 33/06* (2013.01); *G03B 21/008* (2013.01); *G03B 21/28* (2013.01); *G09G 3/025* (2013.01);
(Continued)

(58) Field of Classification Search
CPC ...... G03B 21/14; G03B 21/28; G03B 21/145; G02B 26/08; G02B 26/10; G02B 26/085;
(Continued)

(56) References Cited

U.S. PATENT DOCUMENTS

2003/0184844 A1* 10/2003 Yazdi ................. G02B 26/0841
359/298
2007/0041068 A1* 2/2007 Heminger .......... G02B 26/0841
359/199.1
(Continued)

FOREIGN PATENT DOCUMENTS

JP      2008-233562    10/2008
JP      2009-058590    3/2009
(Continued)

OTHER PUBLICATIONS

International Search Report for PCT/JP2016/055392 dated Apr. 26, 2016.

*Primary Examiner* — Sultan Chowdhury
(74) *Attorney, Agent, or Firm* — IPUSA, PLLC (57) ABSTRACT

An optical scanning control device includes a scanner that scans light emitted from a laser in accordance with an image signal to form an image on a screen; a first optical detector that detects light scanned by the scanner; a second optical detector that detects light scanned by the scanner; and a controller that controls a deflection angle of the scanner based on a time difference between an output of the first optical detector and an output of the second optical detector.

7 Claims, 10 Drawing Sheets

(51) Int. Cl.
*G03B 21/00* (2006.01)
*H04N 9/31* (2006.01)
*G09G 3/02* (2006.01)

(52) U.S. Cl.
CPC ......... *H04N 9/3129* (2013.01); *H04N 9/3155* (2013.01); *H04N 9/3164* (2013.01)

(58) Field of Classification Search
CPC . G02B 26/101; G02B 26/105; G02B 26/0833
See application file for complete search history.

(56) References Cited

U.S. PATENT DOCUMENTS

| | | | |
|---|---|---|---|
| 2007/0268553 A1* | 11/2007 | Schneider | G02B 6/3588 359/290 |
| 2009/0059179 A1 | 3/2009 | Kobori et al. | |
| 2009/0316243 A1* | 12/2009 | Tsuida | B41J 2/471 359/202.1 |
| 2013/0120718 A1* | 5/2013 | Chikaoka | G02B 26/101 353/85 |
| 2015/0177515 A1 | 6/2015 | Irzyk | |

FOREIGN PATENT DOCUMENTS

| | | |
|---|---|---|
| JP | 2011-133728 | 7/2011 |
| JP | 2012-181479 | 9/2012 |
| JP | 2013-011852 | 1/2013 |
| JP | 2014-235268 | 12/2014 |
| WO | 2010/058462 | 5/2010 |
| WO | 2014/013142 | 1/2014 |

\* cited by examiner

OPTICAL SCANNING CONTROL DEVICE

TECHNICAL FIELD

The present invention relates to an optical scanning control device.

BACKGROUND ART

An optical scanning control device has been known that scans a laser beam to display an image. This optical scanning control device includes a first detector that directly detects light emitted from a light source without going through any optical system and a second detector that detects light emitted from the light source through an optical system. Then, based on a combination of detection results by the first detector and the second detector, a determination of abnormality, etc., can be made (cf. Patent Document 1, for example).

PRIOR ART DOCUMENTS

Patent Documents

Patent Document 1: Japanese Unexamined Patent Publication No. 2013-11852

SUMMARY OF THE INVENTION

Problem to be Solved by the Invention

Meanwhile, in an optical scanning control device for scanning a laser beam, for example, a displacement sensor for detecting a degree of tilt of a mirror for scanning light is provided in an optical scanning unit for scanning a laser beam, and a deflection angle of the mirror is controlled based on an output of the displacement sensor.

However, there has been a problem such that a deflection angle is not accurately controlled when the displacement sensor has temperature dependence, or when there are aging, time dependent variations, etc.

The present invention has been achieved in view of the above-described points, and an object is to provide an optical scanning control device capable of accurately detecting a deflection angle.

Means for Solving the Problem

It is required that an optical scanning control device (1) includes a scanner (310) that scans light emitted from a laser (211R, 211G, and 211B) in accordance with an image signal to form an image on a screen (50); a first optical detector (61) that detects light scanned by the scanner (310); a second optical detector (62) that detects light scanned by the scanner (310); and a controller (12) that controls a deflection angle of the scanner (310) based on a time difference (i) between an output of the first optical detector (61) and an output of the second optical detector (62).

Note that the reference numerals in parentheses are added to facilitate understanding, are merely examples, and do not limit the invention to the depicted embodiment.

Advantageous Effect of the Invention

According to disclosed technology, an optical scanning control device can be provided that is capable of accurately controlling a deflection angle.

EMBODIMENTS FOR IMPLEMENTING THE INVENTION

In the following, an embodiment for implementing the present invention is described by referring to the drawings. In each drawing, the same reference numerals may be attached to the same components, and duplicate descriptions may be omitted.

Figure 1:
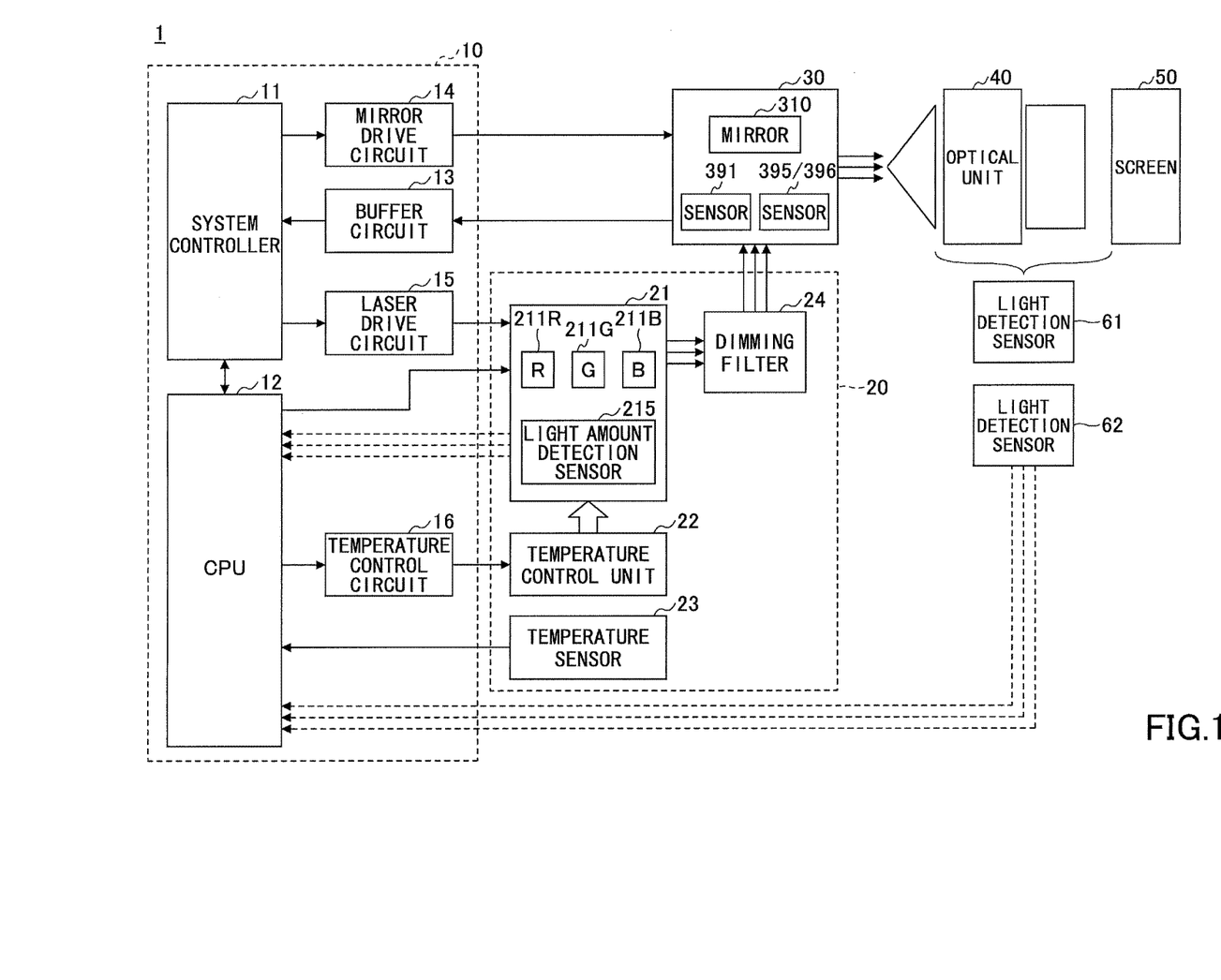
FIG. 1 is a block diagram exemplifying an optical scanning control device according to an embodiment.
Figure 2:
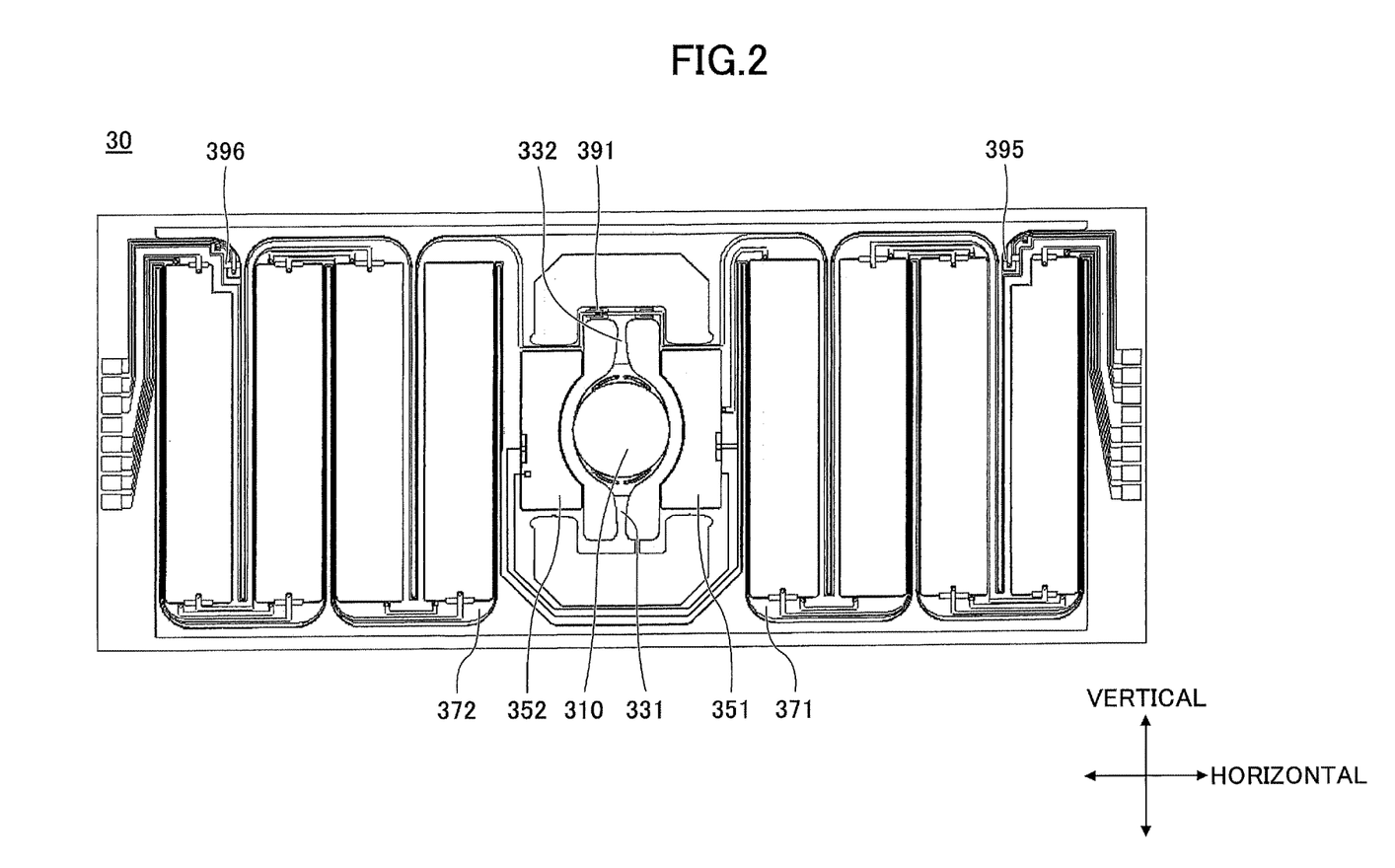
FIG. 2 is a plan view exemplifying an optical scanner that forms the optical scanning control device.

FIG. 1 is a block diagram exemplifying an optical scanning control device according to the embodiment. FIG. 2 is a plan view exemplifying an optical scanner, which forms the optical scanning control device. FIG. 3A, FIG. 3B, FIG. 4A, and FIG. 4B are external views exemplifying the optical scanning control device according to the embodiment.

(Schematic Configuration of the Optical Scanning Control Device)

First, by referring to FIG. 1 through FIG. 4B, a schematic configuration of the optical scanning control device 1 is described. The optical scanning control device 1 includes, as main components, a circuit unit 10; a light source unit 20; an optical scanning unit 30; an optical unit 40; a screen 50; and light detection sensors 61 and 62, which are accommodated in a housing 100. The optical scanning control device 1 is, for example, a laser scanning type projector.

The circuit unit 10 is a part for controlling the light source unit 20 and the optical scanning unit 30, and can be formed of, for example, a system controller 11, a CPU (Central Processing Unit) 12, various types of drive circuits, etc. Note that the system controller 11 and the CPU 12 are configured so as to allow bidirectional information transmission.

The light source unit 20 includes an LD module 21; a temperature control unit 22; a temperature sensor 23; and a dimming filter 24.

The LD module 21 includes lasers 211R, 211G, and 211B, for which amounts of emitted light vary depending on electric current values; a light amount detection sensor 215 for monitoring the amounts of light in close proximity to the lasers 211R, 211G, and 211B (immediately after emitting the laser beams); etc. The laser 211R is, for example, a red semiconductor laser, and is capable of emitting light with a wavelength AR (e.g., 640 nm). The laser 211G is, for example, a green semiconductor laser, and is capable of emitting light with a wavelength AG (e.g., 530 nm). The laser 211G is, for example, a blue semiconductor laser, and is capable of emitting light with a wavelength AB (e.g., 445 nm). As the light amount detection sensor 215, for example, a photodiode, etc., can be used. The light amount sensor 215 can be disposed at any position at which the amount of light prior to being scanned by the optical scanning unit 30 can be detected.

The temperature control unit 22 is capable of controlling the lasers 211R, 211G, and 211B to be a predetermined temperature. The temperature sensor 23 is capable of detecting temperatures of the lasers 211R, 211G, and 211B, respectively. As the temperature control unit 22, for example, a Peltier element can be used. As the temperature sensor 23, for example, a thermistor can be used.

The optical scanning unit 30 is, for example, a MEMS (Micro Electro Mechanical System) in which a piezoelectric element is caused to drive a mirror 310. The mirror 310 functions as a scanner for two-dimensionally scanning incident light, by reflecting the light emitted from the lasers 211R, 211G, and 211B (combined light), in a horizontal direction and in a vertical direction in accordance with an image signal so as to form an image on the screen 50.

Specifically, as illustrated in FIG. 2, the mirror 310 is supported from both sides by torsional beams 331 and 332, which form a shaft (vertical shaft for horizontal fluctuation). In the direction perpendicular to the torsional beams 331 and 332, driving beams 351 and 352 are provided as a pair so as to nip the mirror 310. By piezoelectric elements formed on respective surfaces of the driving beams 351 and 352, with the torsional beams 331 and 332 as the shaft, the mirror 310 can be fluctuated around the shaft. The direction in which the mirror 310 is fluctuated around the shaft of the torsional beams 331 and 332 is referred to as the horizontal direction below. For horizontal driving by the driving beams 351 and 352, for example, a resonant oscillation is used, so that the mirror 310 can be driven at a high speed. A horizontal displacement sensor 391 is a sensor for detecting a degree of a tilt of the mirror 310 in the horizontal direction in a state where the mirror 310 fluctuates in the horizontal direction.

Further, outside the driving beams 351 and 352, driving beams 371 and 372 are provided as a pair. By piezoelectric elements formed on respective surfaces of the driving beams 371 and 372, the mirror 310 can be fluctuated in the vertical direction, which is a direction perpendicular to the horizontal direction. Vertical displacement sensors 395 and 396 are sensors for detecting a degree of a tilt of the mirror 310 in the vertical direction in a state in which the mirror 310 is fluctuated in the vertical direction. Note that, for example, the optical scanning unit 30 is installed in a ceramic package together with the drive circuit, etc., in a unit 150 (cf. FIG. 3B), and is covered with a ceramic cover.

Figure 3A:
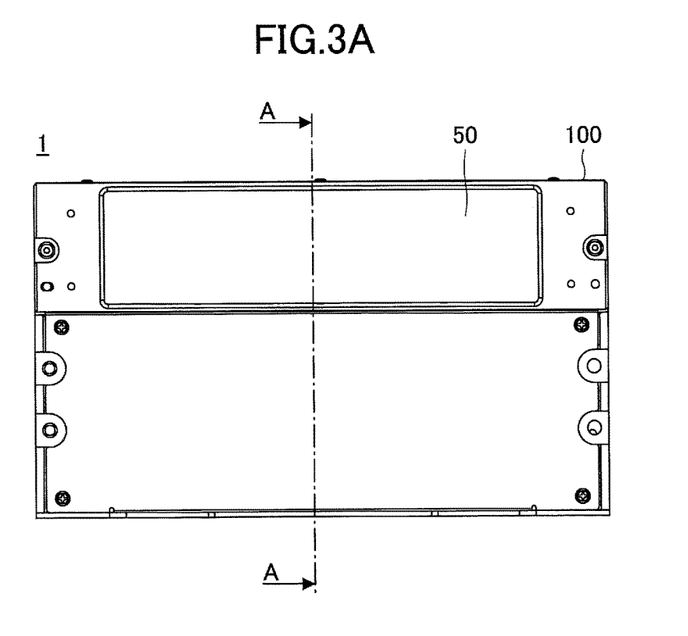
FIG. 3A is an external view (version 1) exemplifying the optical scanning control device according to the embodiment.
Figure 3B:
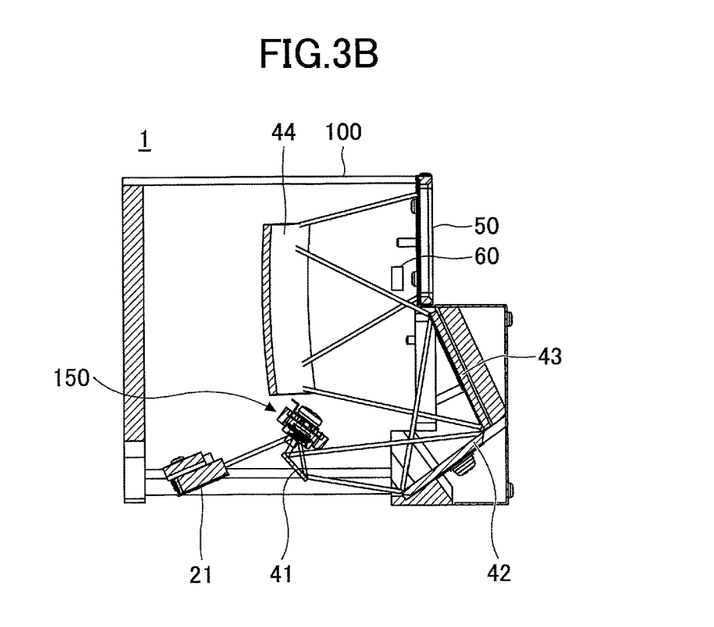
FIG. 3B is an external view (version 1) exemplifying the optical scanning control device according to the embodiment.
Figure 4A:
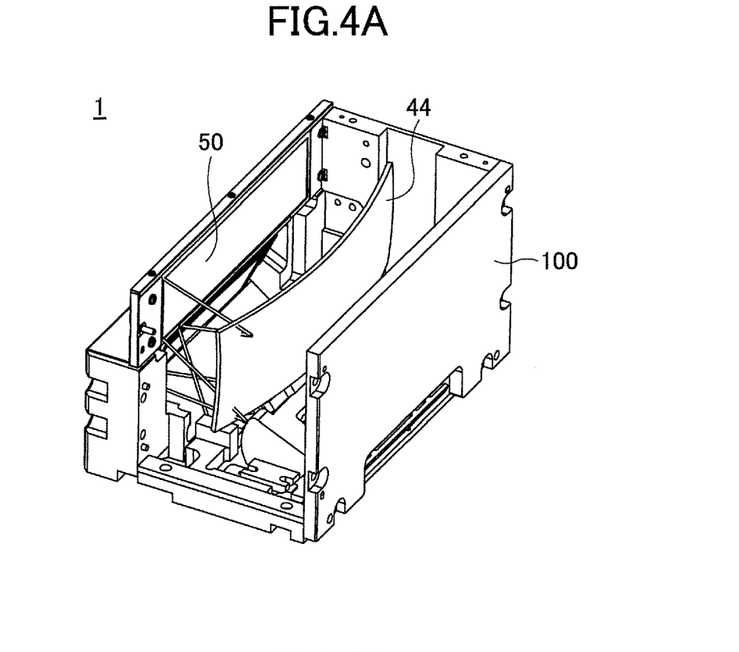
FIG. 4A is an external view (version 2) exemplifying the optical scanning control device according to the embodiment.
Figure 4B:
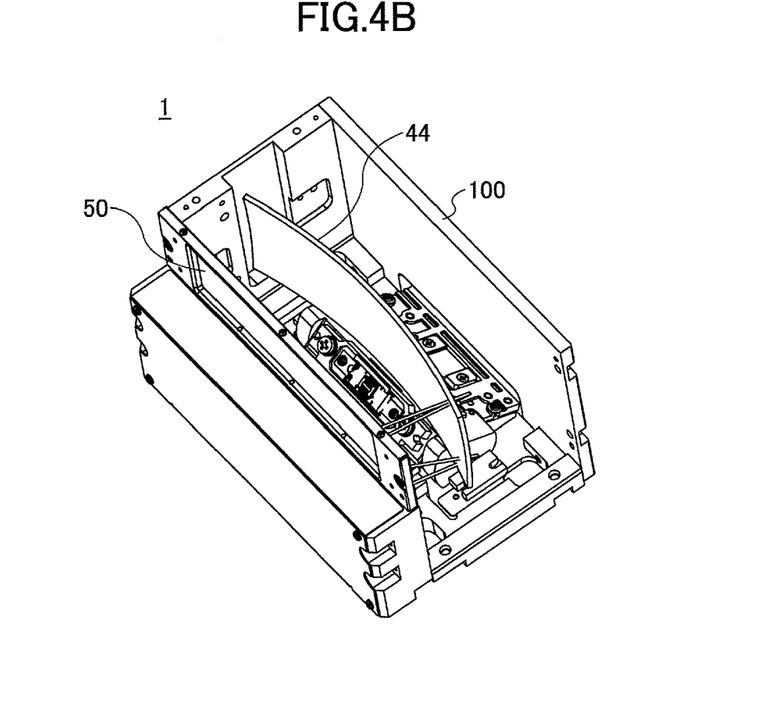
FIG. 4B is an external view (version 2) exemplifying the optical scanning control device according to the embodiment.

The optical unit 40 is an optical system for projecting light scanned by the light scanning unit 30 onto the screen 50, and includes, for example, a reflection mirror 41, a reflection mirror 42, a reflection mirror 43, a concave mirror 44, etc., as illustrated, for example, in FIG. 3B. The light that enters the optical unit 40 from the light scanning unit 30 is caused to be approximately parallel light by the concave mirror 44 so as to form an image on the screen 50, so that the image in accordance with an image signal is drawn on the screen 50. The screen 50 is preferably provided with a function for removing noise on an image (e.g., a microlens array), which can be seen as granular referred to as speckle.

The light detection sensors 61 and 62 are disposed at any positions at which the light scanned by the optical scanning unit 30 can be detected. As the light detection sensors 61 and 62, for example, photodiodes, etc., can be used. Note that the light detection sensor 61 is a typical example of a first optical director according to the present invention, and the light detection sensor 62 is a typical example of a second optical director according to the present invention.

(Outline of the Operation of the Optical Scanning Control Device)

Next, an outline of the operation of the optical scanning control device 1 is described. The system controller 11 can control, for example, a deflection angle of the mirror 310. The system controller 11 can monitor, through a buffer circuit 13, a tilt of the mirror 310 in the horizontal direction and in the vertical direction obtained, for example, by the horizontal displacement sensor 391 and the vertical displacement sensors 395 and 396, and can provide an angle control signal to the mirror drive circuit 14. Then, the mirror drive circuit 14 supplies predetermined drive signals to the driving beams 351 and 352 and the driving beams 371 and 372 based on the angle control signal from the system controller 11, so that the mirror 310 can be driven (scanned) by the predetermined angle.

Further, the system controller 11 can supply, for example, a digital image signal to the laser drive circuit 15. Then, the laser drive circuit 15 supplies predetermined electric currents to the lasers 211R, 211G, and 211B based on the image signal from the system controller 11. As a result, the lasers 211R, 211G, and 211B emit red, green, and blue light modulated in accordance with the image signal, and a color image can be formed by combining them.

For example, the CPU 12 monitors amounts of emitted light at origins of the lasers 211R, 211G, and 211B (immediately after emission of the laser light) by an output of the light amount detection sensor 215, and can supply a light amount control signal to the LD module 21. The electric currents to the lasers 211R, 211G, and 211B are controlled based on the light amount control signal from the CPU 12 so as to achieve predetermined output (light amount).

Note that the light amount detection sensor 215 may be configured so as to include three sensors for independently detecting the amounts of the light emitted from the lasers 211R, 211G, and 211B. Alternatively, the light amount detection sensor 215 may be formed of only one sensor. In this case, by sequentially causing the lasers 211R, 211G, and 211B to emit light to be sequentially detected by a single sensor, amounts of the light emitted from the laser 211R, 211G, and 211B can be controlled.

Further, the CPU 12 can monitor the temperature of the lasers 211R, 211G, and 211B with the output of the temperature sensor 23, and can supply a temperature control signal to a temperature control circuit 16. Then, the temperature control circuit 16 supplies a predetermined electric current to the temperature control unit 22 based on the temperature control signal from the CPU 12. As a result, the temperature control unit 22 is heated or cooled, and each laser can be controlled to be a predetermined temperature.

The light beams with respective wavelengths emitted from the lasers 211R, 211G, and 211B are combined by a dichroic mirror, etc., and enter the mirror 310 after being dimmed by the dimming filter 24 to be a predetermined light amount. The mirror 310 two-dimensionally scans the incident light, and the scanned light is irradiated onto the screen 50 through the optical unit 40 so as to form a two-dimensional image on the screen 50. The functions of the light detection sensors 61 and 62 are described later.

(Deflection Angle Control of the Optical Scanning Unit)

As described above, based on the output values of the horizontal displacement sensor 391 and the vertical displacement sensors 395 and 396, the deflection angle of the mirror 310 is controlled by the system controller 11. However, when the horizontal displacement sensor 391 and the vertical displacement sensors 395 and 396 have temperature dependence, or when the deflection angle varies due to aging, time dependent variations, or another factor, accurate deflection angle control may not be performed only with the information from the horizontal displacement sensor 391 and the vertical displacement sensors 395 and 396. In particular, if the information from the horizontal displacement sensor 391 is inaccurate, accurate deflection angle control may not be performed, and a problem is caused that the width of the image drawn on the screen 50 is not constant.

Thus, in the optical scanning control device 1, the light detection sensors 61 and 62 are provided for detecting light after being scanned by the optical scanning unit 30. The detection results by the light detection sensors 61 and 62 are input to the CPU 12, a necessary angle control amount is calculated by the CPU 12, and the calculation result is transmitted to the system controller 11. The system controller 11 can supply an angle control signal to the mirror drive circuit 14 based on the information from the CPU 12. Consequently, an accurate angle of the mirror 310 in the horizontal direction can be detected, even if the horizontal displacement sensor 391 has temperature dependence, so that accurate deflection angle control of the mirror 310 in the horizontal direction is allowed.

Figure 5:
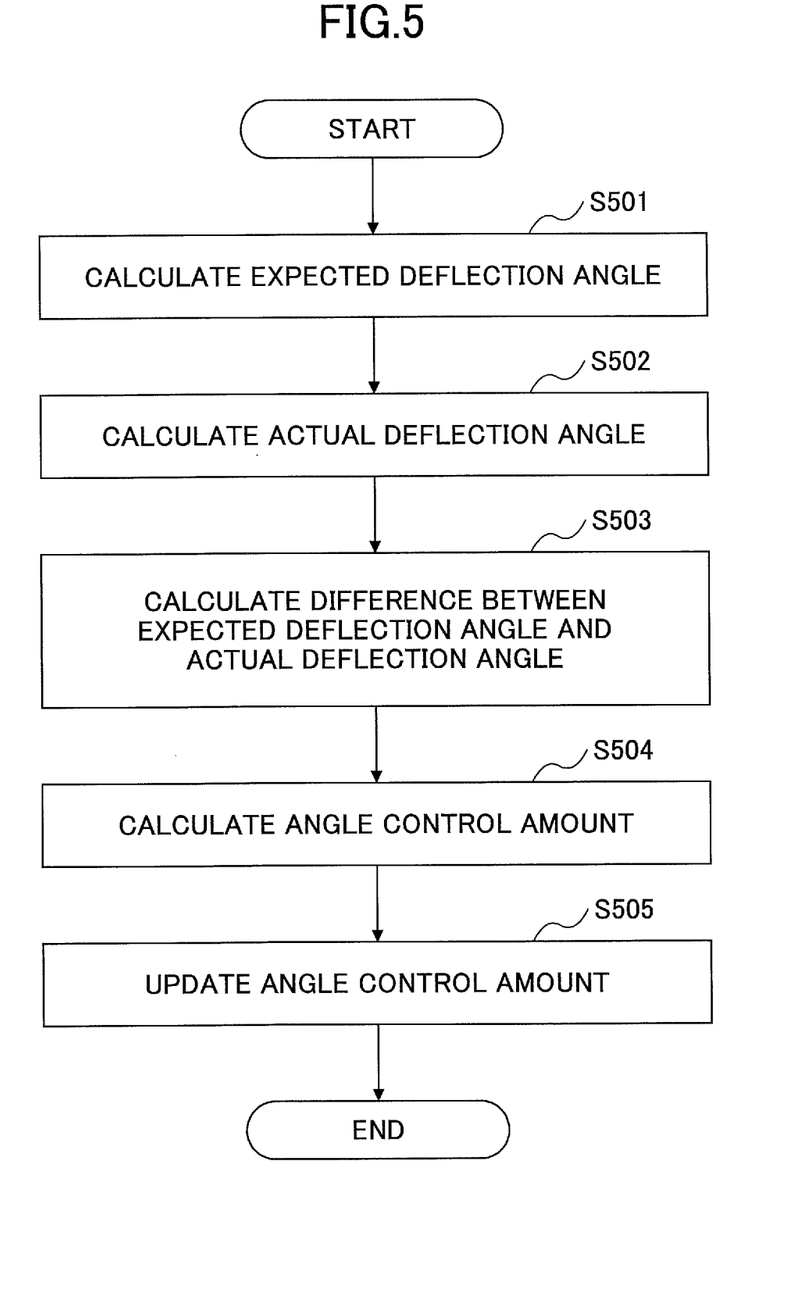
FIG. 5 is an example of a flowchart of deflection angle control in the optical scanning control device according to the embodiment.

In the following, by referring to FIG. 5 through FIG. 7, the deflection angle control in the optical scanning control device 1 using the light detection sensors 61 and 62 is described in further detail. FIG. 5 is an example of a flowchart of the deflection angle control using the light detection sensors 61 and 62. First, at step S501, the CPU 12 calculates an expected deflection angle of the mirror 310.

Next, at step S502, the CPU 12 causes a laser to emit light, measures a time difference between the output (pulse signal) of the light detection sensor 61 and the output (pulse signal) of the light detection sensor 62, and converts the measured time difference into a deflection angle of the mirror 310. Note that, as an object is to measure the time difference between the output of the optical sensor 61 and the output of the optical sensor 62, the CPU 12 is not required to cause all the lasers 211R, 211G, and 211B to emit light, and it suffices if one or more of them are caused to emit light.

Figure 6A:
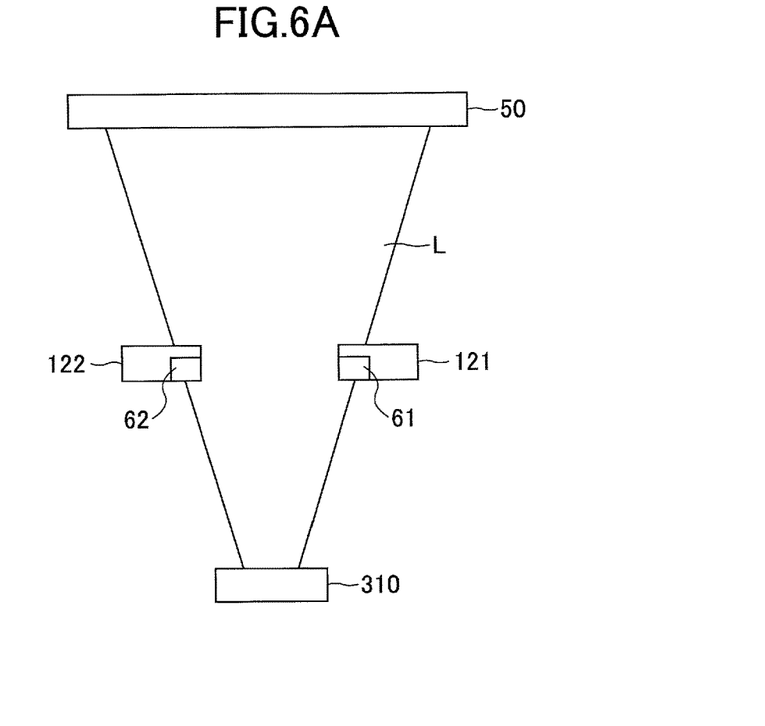
FIG. 6A is a diagram illustrating an arrangement of optical detection sensors and timing for causing a laser to emit light.
Figure 6B:
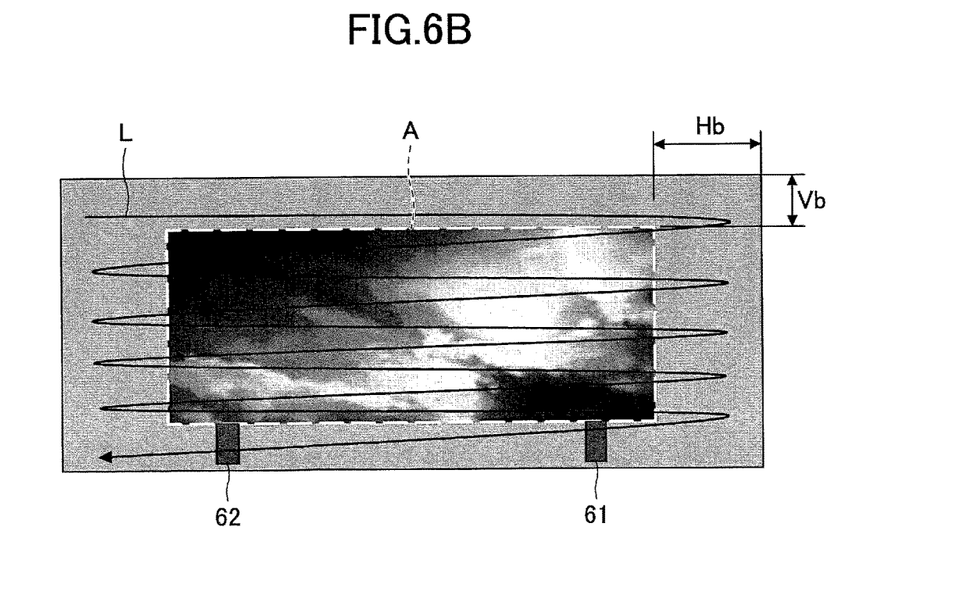
FIG. 6B is a diagram illustrating the arrangement of the optical detection sensors and the timing for causing the laser to emit the light.

Here, referring to FIG. 6A and FIG. 6B, the arrangement of the light detection sensors 61 and 62 and the timing for causing, by the CPU 12, the laser to emit light are described. As illustrated in FIG. 6A, the light detection sensors 61 and 62 are arranged between the mirror 310 of the optical scanning unit 30 and the screen 50. As the laser beam L for detecting the deflection angle has nothing to do with the image, covers 121 and 122 for preventing stray light may preferably be provided in the light detection sensors 61 and 62.

FIG. 6B schematically illustrates an image, etc., drawn on the screen 50. In FIG. 6B, Hb and Vb indicated in gray are a horizontal blanking interval and a vertical blanking interval, respectively. As the horizontal blanking interval Hb and the vertical blanking interval Vb are blocked by the housing 100, only inside the area A surrounded by the dotted line can be visually recognized as the image actually drawn on the screen 50.

Thus, in the trajectory of the laser beam L in FIG. 6B, by emitting the laser light for detecting the deflection angle in the horizontal blanking interval Hb and the vertical blanking interval Vb, the outputs of the light detection sensors 61 and 62 can be measured without affecting on the image drawn on the screen 50.

Especially, the light detection sensors 61 and 62 are preferably arranged in the vertical blanking interval excluding the horizontal blanking interval. The reason why it is not preferable to arrange the light detection sensors 61 and 62 in the horizontal blanking interval is that, as the horizontal blanking interval is close to the folding point of the sine wave of the driving waveform (as the scanning speed is slow), the detection precision decreases.

Figure 7:
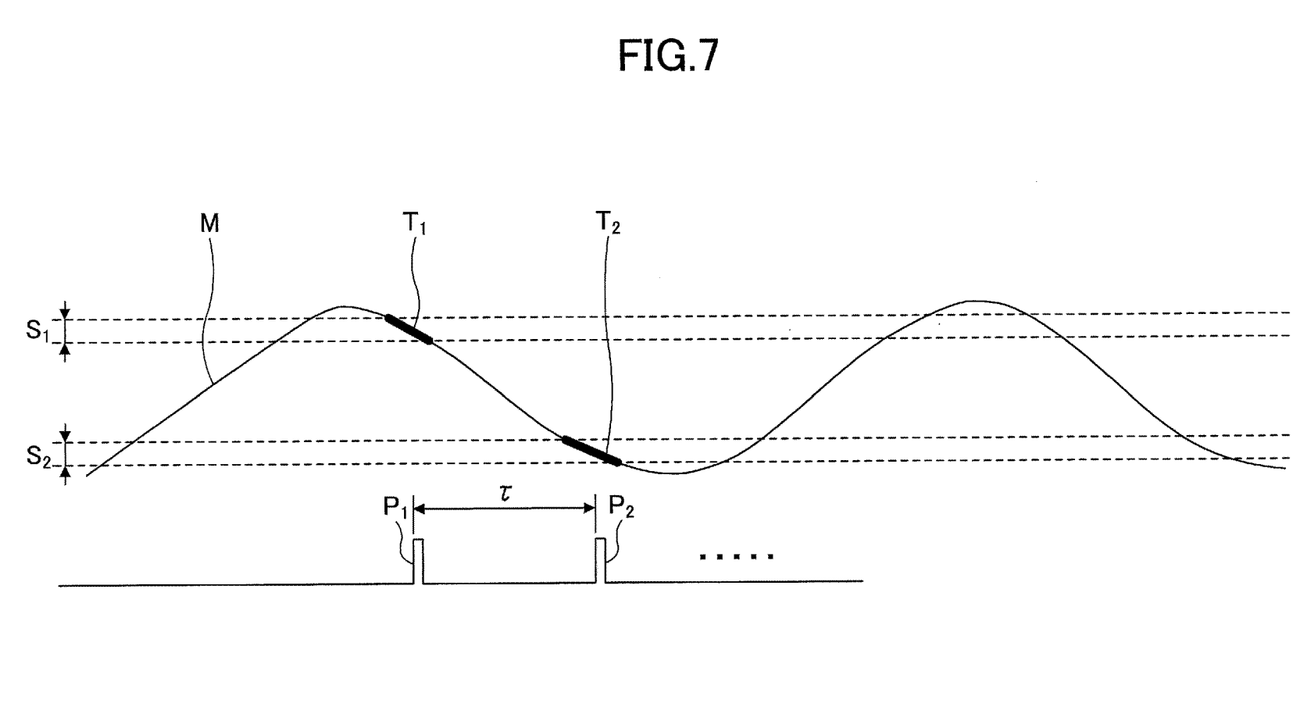
FIG. 7 is a diagram exemplifying an output waveform, etc., of the optical detection sensors.

FIG. 7 illustrates, when the light detection sensors 61 and 62 are arranged in the lower vertical blanking interval Vb excluding the horizontal blanking interval Hb, for example, as illustrated in FIG. 6B, the outputs of the light detection sensors 61 and 62 upon the laser beam L passing on the light detection sensors 61 and 62. Note that the same applies when the light detection sensors 61 and 62 are arranged in the upper vertical blanking interval Vb excluding the horizontal blanking interval Hb.

In FIG. 7, M indicates the driving waveform of the mirror 310, $S_1$ indicates the interval for the light detection sensor 61 to detect the deflection angle, and $S_2$ indicates the interval for the light detection sensor 62 to detect the deflection angle. By emitting the laser beam at the timing $T_1$ at which the driving waveform M overlaps the interval $S_1$, the output $P_1$ (pulse) is output of the light detection sensor 61 in synchronization with the timing $T_1$. Further, by emitting the laser beam at the timing $T_2$ at which the driving waveform M overlaps the interval $S_2$, the output $P_2$ (pulse) is output of the light detection sensor 62 in synchronization with the timing $T_2$.

The CPU 12 measures a time difference $\tau$ between the output $P_1$ of the light detection sensor 61 and the output $P_2$ of the light detection sensor 62, and calculates the actual deflection angle from the measured time difference $\tau$. Note that, as the light detection sensors 61 and 62 are arrange in the vertical blanking interval Vb, the laser beam may be continuously emitted from the timing $T_1$ to $T_2$.

Here, an example of a method of calculating the actual deflection angle (phase difference $\varphi$) from the time difference $\tau$ is shown. First, as the driving of the mirror 310 in the horizontal direction is caused by resonance, it is assumed that the driving waveform (e.g., M in FIG. 7) is a sine wave. When the frequency of the driving waveform in the horizontal direction is f [Hz], though it varies, it is a value known to the system controller 11 because the driving frequency f is controlled by the system controller 11 so that it becomes the optimum frequency (the resonance frequency of the mirror 310).

When the deflection angle of the mirror 310 is constant, the light detection sensors 61 and 62 have a determined phase difference with respect to the driving waveform (the sine wave) in the horizontal direction. For example, when the deflection angle is the configured value, and when the light detection sensors 61 and 62 are arranged at positions corresponding to the apexes of the sine wave (positions almost corresponding to the amplitudes of the sine wave), respectively, the phase difference φ is π [rad], which is the half period.

Consequently, the time difference τ [sec] for the laser beam (the scanning beam) to pass through the light detection sensors 61 and 62 is a half of the inverse of the driving frequency f, that is τ=½f. However, the light detection sensors 61 and 62 are not arranged very close to the amplitudes of the sine wave. The reason is that, when the light detection sensors 61 and 62 are arranged very close to the amplitudes of the sine wave, when the angle of view becomes narrow, the laser beam does not pass through the light detection sensors 61 and 62, so that nothing can be detected.

Figure 10:
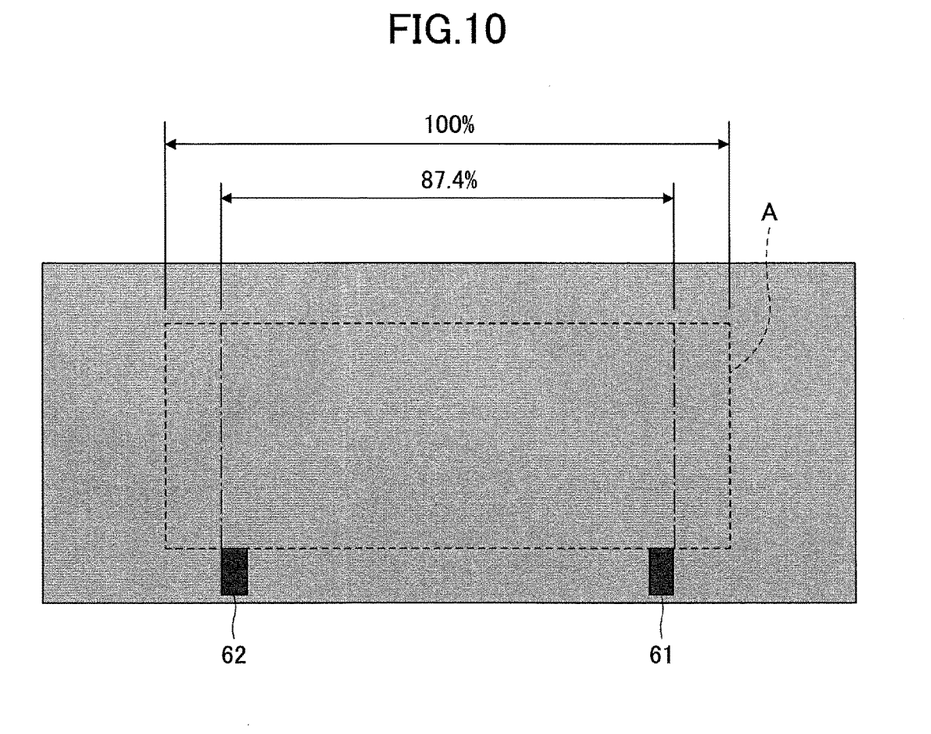
FIG. 10 is a diagram illustrating an optimum arrangement of the optical detection sensors.

Namely, as illustrated in FIG. 10, which is described below, the light detection sensors 61 and 62 are preferably arranged at marginal positions ($φ_{OPT}$) at which detection can be made even if the angle of view is narrowed, and the time difference τ at this time is τ=(1/f)×($φ_{OPT}$/2η). This formula indicates that the phase difference φ can be obtained by measuring the time difference τ. Note that $φ_{OPT}$ corresponds to the expected deflection angle described at step S501.

Namely, by measuring the time difference τ by the CPU 12, the actual deflection angle (the phase difference φ) can be calculated from the measured time difference τ. Note that the above-described calculation method is an example, and it is not limited to this calculation method.

Referring back to the description of FIG. 5, next, at step S503, the CPU 12 calculates a difference between the expected deflection angle calculated at step S501 and the actual deflection angle calculated at step S502 (the deflection angle converted from the time difference). Next, at step S504, the CPU 12 calculates an angle control amount with which the difference calculated at step S503 becomes zero (with which the converted deflection angle becomes equal to the expected deflection angle), and transmits the calculation result to the system controller 11.

Next, at step S505, the system controller 11 supplies an updated angle control signal to the mirror drive circuit 14 based on the information from the CPU 12. The mirror drive circuit 14 supplies predetermined drive signals to the driving beams 351 and 352 based on the angle control signal from the system controller 11, and drives the mirror 310 by a predetermined angle. As a result, for example, when it is detected, at step S502, that the phase difference φ>$φ_{OPT}$, the mirror 310 is controlled so that the deflection angle is reduced. Conversely, when it is detected that the phase difference φ<$φ_{OPT}$, it is controlled so that the deflection angle is increased.

As described above, by arranging, in the optical scanning control device 1, the light detection sensors 61 and 62 at a latter part compared to the optical scanning unit 30, an accurate deflection angle of the mirror 310 in the horizontal direction can be detected based on the outputs of the light detection sensors 61 and 62. Accordingly, even if the horizontal displacement sensor 391 has temperature dependence, accurate deflection angle control of the mirror 310 in the horizontal direction is allowed using the outputs of the light detection sensors 61 and 62. As a result, an image with a constant width can be drawn on the screen 50 without depending on the temperature, etc.

Note that more precise deflection angle control can be performed by using the control using the light detection sensors 61 and 62 together with the control using the horizontal displacement sensor 391 and the vertical displacement sensors 395 and 396.

For example, a method can be considered such that an ambient temperature is detected by a temperature sensor, and, upon detecting that it is close to a normal temperature, control using the horizontal displacement sensor 391 and the vertical displacement sensors 395 and 396 are performed; and, upon detecting that a temperature variation from the normal temperature becomes large, it is switched to control using the light detection sensors 61 and 62 and the vertical displacement sensors 395 and 396.

However, it is possible to control only using the light detection sensors 61 and 62 and the vertical displacement sensors 395 and 396, without performing the control using the horizontal displacement sensor 391. In this case, accurate deflection angle control of the mirror 310 in the horizontal direction is also allowed, and an image with a constant width can be drawn on the screen 50 without depending on the temperature, etc.

Note that the light detection sensors 61 and 62 may be arranged at any positions, provided that the light scanned by the optical scanning unit 30 can be detected. However, if it is at a latter part of the reflection mirror 41 illustrated in FIG. 3B (at the side of the screen 50), the trajectory of the laser light deviates from the sine wave, and the calculation for compensation becomes complicated. Accordingly, the light detection sensors 61 and 62 are preferably arranged between the optical scanning unit 30 and the reflection mirror 41 so as to detect the light prior to entering the optical unit 40.

Next, examples are shown that are of the variation in the deflection angle in the horizontal direction when the temperature actually varies and of the width of the image drawn at that time. The optical scanning control device 1 can be installed in a vehicle, and, for example, the operating temperature range in this case is assumed approximately from −40° C. to 85° C. Thus, the relationship between the temperature and the deflection angle in the horizontal direction was measured within the range from −40° C. to 85° C. Table 1 shows the result. Further, Table 1 is graphed and shown in FIG. 8.

TABLE 1

Figure 8:
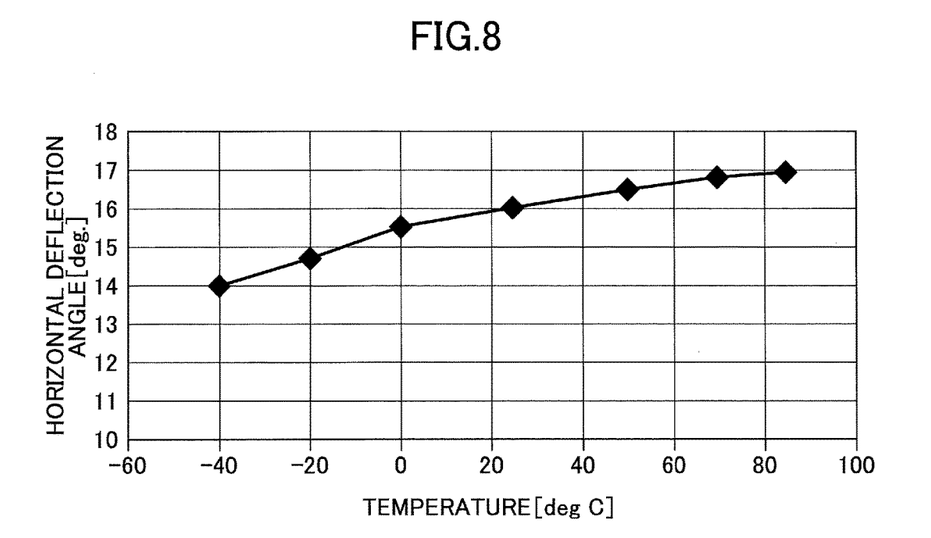
FIG. 8 is a diagram exemplifying a relation between a temperature and a deflection angle in a horizontal direction.

| Temperature [deg. C.] | Deflection angle [deg.] |
| --- | --- |
| −40 | 14.005 |
| −20 | 14.716 |
| 0 | 15.540 |
| 25 | 16.000 |
| 50 | 16.421 |
| 70 | 16.784 |
| 85 | 16.918 |

As shown in Table 1 and FIG. 8, when the deflection angle 16.000 deg at 25° C. is set as a reference, the deflection angle decreases to 14.005 deg (87.4% of the reference) at −40° C. Further, the deflection angle increases to 16.918 deg (105.8% of the reference) at 85° C.

Figure 9:
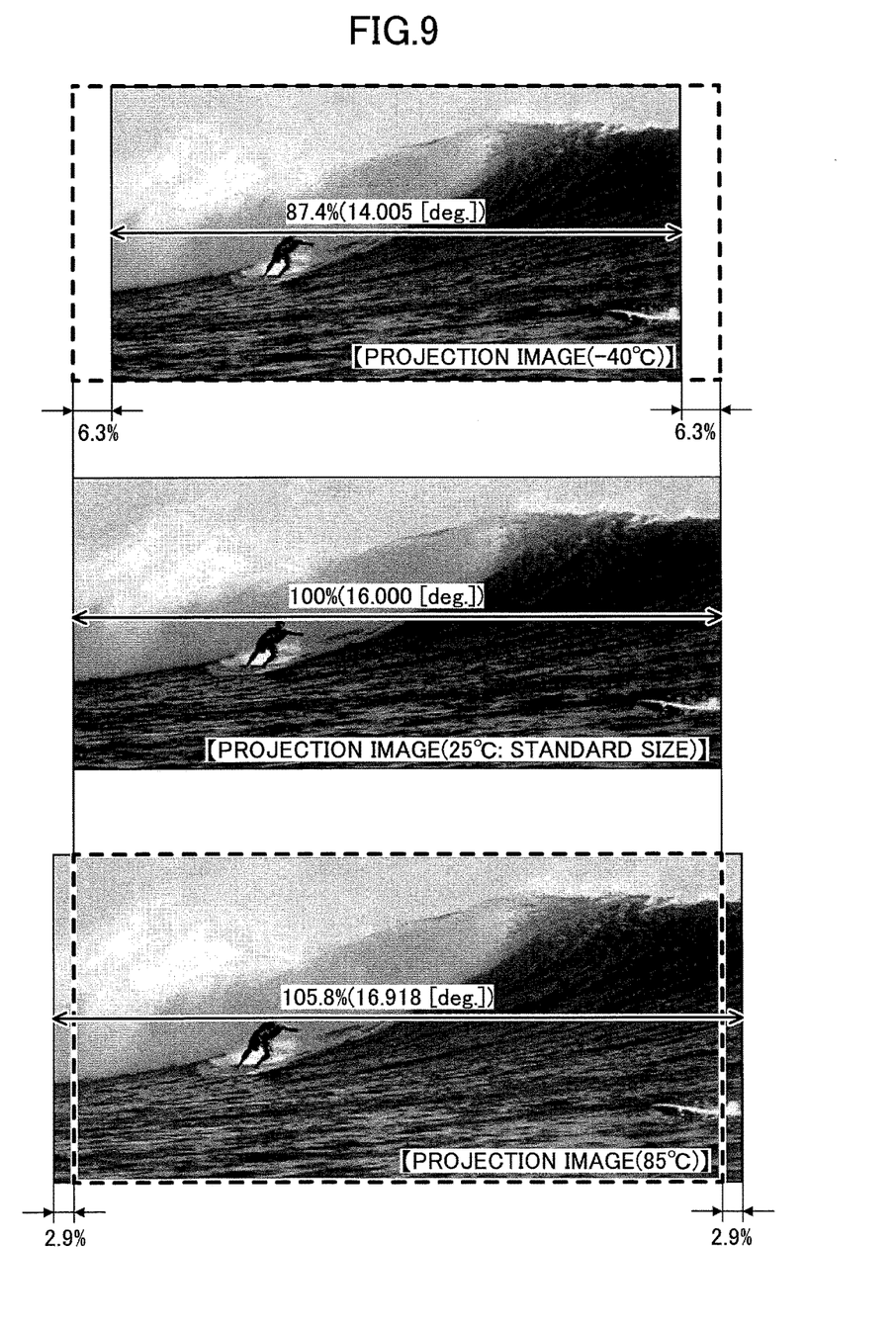
FIG. 9 is a diagram illustrating a situation in which a width of an image expands and contracts depending on a temperature.

As described above, as a result that the deflection angle in the horizontal direction varies depending on the temperature, the width of the image drawn on the screen 50 of the optical scanning control device 1 expands and contracts depending on the temperature, as illustrated in FIG. 9. Namely, when the width of the image at 25° C. is set to be a reference size, in this example, the width of the image at −40° C. shrinks on both sides by 6.3% by the decrease in the deflection angle, and it becomes 87.4% of the reference size. Further, the width of the image at 85° C. expands on both sides by 2.9% by the increase in the deflection angle, and it becomes 105.8% of the reference size.

In this case, by performing the deflection angle control described by referring to FIG. 5, etc., the width of the image at −40° C. and the width of the image at 85° C. can be compensated for, so that the widths become approximately the same as the width of the image at 25° C. (the reference size).

Here, in order to implement such compensation, it is required to detect the deflection angle of the mirror 310 corresponding to the width of the image expected at −40° C. (the minimum width of the image) by the light detection sensors 61 and 62. For this reason, it is required to arrange the light detection sensors 61 and 62 within a range of the deflection angle of the mirror 310 corresponding to the width of the image expected at −40° C.

However, when the arrangement interval between the light detection sensor 61 and the light detection sensor 62 is narrow, a resolution of measurement of the time difference τ illustrated in FIG. 7 is lowered, and, accordingly, it is preferable that the arrangement interval between the light detection sensor 61 and the light detection sensor 62 be as wide as possible.

Taking these requirements into consideration, as illustrated in FIG. 10, it is optimal to arrange the light detection sensors 61 and 62 at positions that are furthest from each other in the width direction of the image within the range (approximately 88% of the reference size) in which the deflection angle of the mirror 310 corresponding to the width of the image expected at −40° C. (the expected minimum width of the image) can be detected.

Specifically, as the width of the image at −40° C. is approximately 88% of the reference size, when the width of the image drawn on the screen 50 at a predetermined temperature (25° C.) is assumed to be 100, it is optimal to arrange the light detection sensors 61 and 62 at positions corresponding to 44 on the left and right from the center of the image.

The preferred embodiment is described in detail above; however, it is not limited to the above-described embodiment, and various modifications and substitutions can be made to the above-described embodiment without departing from the scope described in the claims.

For example, in the above-described embodiment, the example is illustrated in which the optical scanning control device according to the present invention is applied to the laser scanning type projector. However, this is merely an example, and the optical scanning control device according to the present invention can be applied to various devices in which the deflection angle after scanning is preferably controlled to be constant. As examples of such devices, there are a head-up display for a vehicle, a laser printer, a laser scan type depilator, a laser head lamp, a laser radar, etc.

Further, in the above-described embodiment, the example is illustrated in which three lasers are provided; however, it suffices if at least one laser is provided. In this case, a single color optical scanning control device can be implemented.

Further, in the above-described embodiment, the light detection sensors 61 and 62 are used for measuring the time difference of the scanning light; however, in addition to this, one or both of the light detection sensors 61 and 62 may be used for detecting the light amount. In this case, based on the output of the sensor for detecting the light amount, the light amount of the laser beam scanned by the optical scanning unit 30 can be controlled to be constant. As a result, the light amount of the laser beam including the variations in the characteristics of the dimming filter 24 and the optical scanning unit 30 can be controlled, so that accurate light amount control required for the image actually displayed on the screen 50 is allowed, and a more precise color balance can be obtained.

DESCRIPTION OF THE REFERENCE NUMERALS

1: optical scanning control device
10: circuit unit
11: system controller
12: CPU
13: buffer circuit
14: mirror drive circuit
15: laser drive circuit
16: temperature control circuit
20: light source unit
21: LD module
22: temperature control unit
23: temperature sensor
24: dimming filter
30: optical scanning unit
40: optical unit
41, 42, 43: reflection mirror
44: concave surface mirror
50: screen
61, 62: light detection sensor
100: housing
121, 122: covers for preventing stray light
150: unit
211R, 211G, 211B: laser
215: light amount detection sensor
310: mirror
351, 352, 371, 372: driving beam
391: horizontal displacement sensor
395, 396: vertical displacement sensor The preferred embodiment of the present invention is described above in detail; however, the present invention is not limited to the specific embodiment, and various modifications and alterations can be made within the gist of the present invention described in the claims.

The present application is based on and claims the benefit of priority of Japanese Patent Application No. 2015-071824 filed on Mar. 31, 2015, the entire contents of Japanese Patent Application No. 2015-071824 are incorporated herein by reference.

The invention claimed is:

1. An optical scanning control device comprising:
   a scanner that scans light emitted from a laser in accordance with an image signal to form an image on a screen;
   a first optical detector that detects light scanned by the scanner;
   a second optical detector that detects light scanned by the scanner; and
   a controller that controls a deflection angle of the scanner based on a time difference between a first output that is output from the first optical detector and a second output that is output from the second optical detector.

2. The optical scanning control device according to claim 1, wherein the first optical detector and the second optical detector are arranged in a vertical blanking interval excluding a horizontal blanking interval.

3. The optical scanning control device according to claim 2, wherein a width of the image drawn on the screen expands and contracts depending on a temperature, wherein the first optical detector and the second optical detector are arranged at positions furthest to each other in a direction of the width of the image within a range in which the deflection angle of the scanner corresponding to an expected minimum width of the image can be detected.

4. The optical scanning control device according to claim 3, wherein, when the width of the image drawn on the screen at a predetermined temperature is assumed to be 100, the first optical detector and the second optical detector are arranged at positions corresponding to 44 on left and right from a center of the image.

5. The optical scanning control device according to claim 1, further comprising:
a plurality of the lasers,
wherein the controller causes one of the plurality of the lasers to emit light so as to measure the time difference.

6. The optical scanning control device according to claim 1, wherein the controller converts the time difference into the deflection angle of the scanner, and the controller controls the deflection angle of the scanner, so that the converted deflection angle matches an expected deflection angle.

7. The optical scanning control device according to claim 1, further comprising:
an optical unit on an optical path between the scanner and the screen,
wherein the first optical detector and the second optical detector detect light prior to entering the optical unit.

* * * * *